US012646901B2

(12) United States Patent
Zhang et al.

(10) Patent No.: US 12,646,901 B2
(45) Date of Patent: Jun. 2, 2026

(54) FIBER AMPLIFIER

(71) Applicant: HUAWEI TECHNOLOGIES CO., LTD., Shenzhen (CN)

(72) Inventors: Lin Zhang, Tianjin (CN); Yaping Liu, Tianjin (CN); Zhiqun Yang, Tianjin (CN); Qiang Guo, Shenzhen (CN); Rui Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 884 days.

(21) Appl. No.: 17/851,307

(22) Filed: Jun. 28, 2022

(65) Prior Publication Data

US 2022/0329035 A1 Oct. 13, 2022

Related U.S. Application Data

(63) Continuation of application No. PCT/CN2020/126743, filed on Nov. 5, 2020.

(30) Foreign Application Priority Data

Dec. 28, 2019 (CN) .......................... 201911383861.1
Mar. 2, 2020 (CN) .......................... 202010135229.1

(51) Int. Cl.
 *H01S 3/067* (2006.01)
 *H01S 3/094* (2006.01)
 (Continued)

(52) U.S. Cl.
 CPC .... *H01S 3/06716* (2013.01); *H01S 3/094007* (2013.01); *H01S 3/10023* (2013.01); *H01S 3/1302* (2013.01)

(58) Field of Classification Search
 CPC ............... H01S 3/0672; H01S 3/06737; H01S 3/06754; H01S 3/1302; H01S 3/10023; H01S 3/09401
 See application file for complete search history.

(56) References Cited

U.S. PATENT DOCUMENTS 6,016,218 A * 1/2000 Jo ..................... H01S 3/094003
 398/1
6,141,142 A 10/2000 Espindola et al.
 (Continued)

FOREIGN PATENT DOCUMENTS

CN 101622560 A 1/2010
CN 102544999 A 7/2012
 (Continued)

OTHER PUBLICATIONS

LeCocq, "Few mode Er3+-doped fiber with micro-structured core for mode division multiplexing in the C-band," Dec. 13, 2013, Optics Express, v. 21, No. 25, p. 31646-31658. (Year: 2013).*
Ran Zengling et al, Er Doped Fiber Amplifiers Based on Novel Long Period Fiber Gratings, Acta Photonica Sinica, vol. 32, No. 1, Jan. 2003, with the English Abstract, 4 pages.
 (Continued)

*Primary Examiner* — Michael Carter

(57) ABSTRACT

A fiber amplifier is provided, including a pump laser (202), a pump and signal combiner (203), and a few-mode doped fiber (204). The pump laser (202) is configured to output pump light. The pump and signal combiner (203) is configured to couple input few-mode signal light and the pump light into the few-mode doped fiber (204). Refractive indexes of a fiber core of the few-mode doped fiber (204) are distributed to be gradient along a radial direction of a cross section, the fiber core is etched with periodic gratings along an axial direction, and periods of the gratings satisfy a phase matching condition. The fiber amplifier achieves strong coupling and co-amplification between optical signal modes, thereby reducing a differential gain between mode groups.

14 Claims, 11 Drawing Sheets

(51) Int. Cl.

| | | |
|---|---|---|
| *H01S 3/10* | (2006.01) | |
| *H01S 3/13* | (2006.01) | |

(56) References Cited

U.S. PATENT DOCUMENTS

| | | | |
|---|---|---|---|
| 9,077,148 | B2 | 7/2015 | Abedin et al. |
| 10,277,354 | B1 * | 4/2019 | Li ........................... H04J 14/04 |
| 2004/0036955 | A1 | 2/2004 | Digonnet et al. |
| 2005/0053351 | A1 | 3/2005 | Guan et al. |
| 2012/0219026 | A1 | 8/2012 | Saracco et al. |
| 2013/0182314 | A1 | 7/2013 | Bennett et al. |
| 2014/0036348 | A1 * | 2/2014 | Bennett .................... G02B 6/02 |
| | | | 385/124 |
| 2015/0192733 | A1 * | 7/2015 | Abedin .............. G02B 6/02071 |
| | | | 385/28 |

FOREIGN PATENT DOCUMENTS

| | | | |
|---|---|---|---|
| CN | 102741719 | A | 10/2012 |
| CN | 102854563 | A | 1/2013 |
| CN | 103474867 | A | 12/2013 |
| CN | 104185804 | A | 12/2014 |
| CN | 105022114 | A | 11/2015 |
| CN | 105490160 | A | 4/2016 |
| CN | 105826798 | A | 8/2016 |
| CN | 106707408 | A | 5/2017 |
| CN | 108181723 | A | 6/2018 |
| CN | 109417263 | A | 3/2019 |
| CN | 109521518 | A | 3/2019 |
| CN | 110829166 | A | 2/2020 |
| CN | 111211471 | A | 5/2020 |
| EP | 0829740 | A2 | 3/1998 |
| IN | 108899751 | A | 11/2018 |
| JP | 2016167489 | A | 9/2016 |

OTHER PUBLICATIONS

Pu Huilan et al, Gain equalization of erbium-doped fiber amplifier based on long period fiber grating, Journal of anzhou Jiaotong University (Natural Sciences), vol. 23, No. 1, Feburay 2004, with the English Abstract, 4 pages.

Georg Rademacher et al, Long-Haul Transmission Over Few-Mode Fibers With Space-Division Multiplexing, Journal of Lightwave Technology, vol. 36, No. 6, Mar. 15, 2018, 7 pages.

Yongmin Jung et al., Reconfigurable Modal Gain Control of a Few-Mode EDFA Supporting Six Spatial Modes, IEEE Photonics Technology Letters, vol. 26, No. 11, Jun. 1, 2014, 4 pages.

Zhao Qinghua, Research in Gain Equalization of Few Mode Erbium Doped Fiber Amplifier, Tianjin University, Dec. 2015, with the English Abstract, 67 pages.

Yongmin Jung et al, Recent progress in SDM amplifiers, Next-Generation Optical Communication: Components, Sub-Systems, and Systems VI. International Society for Optics and Photonics, 2017, 7 pages.

Guifang Li et al, Space-division multiplexing: the next frontier in optical communication, Advances in Optics and Photonics, 2014, 6(4), 75 pages.

Huiyuan Liu et al, Reducing group delay spread using uniform long-period gratings, scientific reports, Published: Mar. 1, 2018, 8 pages.

Weng Yi et al: "Space division multiplexing optical communication using few-mode fibers", Optical Fiber Technology, vol. 36, Apr. 2, 2017, pp. 155-180,XP085114666.

Bigot Laurent: "Few-Mode Erbium Doped Fiber Amplifiers: A Review", Journal of Lightwave Technology, vol. 33, No. 3, Feb. 1, 2015, pp. 588-596, XP011573571.

ONO H:"Recent progress on few-mode fiber amplifier", 2016 IEEE Photonicssociety Summer Topical Meeting Series (SUM), IEEE, Jul. 11, 2016, pp. 74-75, XP032949017.

* cited by examiner

FIBER AMPLIFIER

CROSS-REFERENCE TO RELATED APPLICATIONS

This application is a continuation of International Application No. PCT/CN2020/126743, filed on Nov. 5, 2020, which claims priority to Chinese Patent Application No. 201911383861.1, filed on Dec. 28, 2019, and Chinese Patent Application No. 202010135229.1, filed on Mar. 2, 2020. All of the aforementioned patent applications are hereby incorporated by reference in their entireties.

TECHNICAL FIELD

The present invention relates to the field of optical communication, and in particular, to a fiber amplifier.

BACKGROUND

With rapid growth of a communication capacity requirement, a spatial division multiplexing (SDM) technology based on a few-mode fiber (FMF) and a multi-core fiber (MCF) emerges. An SDM fiber amplifier is needed in a long-distance transmission system using the SDM technology, to simultaneously amplify different spatial channels.

FIG. 1 shows a solution of simultaneously amplifying different spatial channels in few-mode fiber transmission. A plurality of single-mode erbium-doped fiber amplifiers (EDFA) are used for implementation. Specifically, a mode-multiplexed signal input by a few-mode fiber is first demultiplexed into a plurality of single-mode signals, which are then separately amplified by using the single-mode EDFA. The plurality of amplified signals are multiplexed into an output few-mode fiber. Such a few-mode signal amplification method requires three steps of "demultiplexing", "amplification" and "multiplexing", which increase complexity and costs of a system, and further cause extra insertion loss and inter-mode crosstalk. With the increase of a transmission distance, the inter-mode crosstalk accumulates continuously, and a signal-to-noise ratio of a signal in each mode deteriorates, making it difficult to support long-distance transmission.

In addition, currently there are few-mode erbium-doped fiber amplifiers (FM-EDFA) and the like. Compared with the multi-channel single-mode EDFA, the FM-EDFA has a lower cost, but gain differences between modes of the FM-EDFA are unbalanced. A differential mode gain (DMG) is relatively large, and an amplification noise figure (NF) between different modes varies greatly, leading to inconsistent transmission performance of signals of the modes, which is not conducive to long-distance transmission.

SUMMARY

Embodiments of the present invention provide a fiber amplifier, to achieve strong coupling and co-amplification between signal modes, thereby reducing a differential gain between mode groups.

According to a first aspect, embodiments of the present invention provide a fiber amplifier, including a pump laser, a pump and signal combiner, and a few-mode doped fiber. The pump laser is configured to output pump light. The pump and signal combiner is configured to couple input few-mode signal light and the pump light into the few-mode doped fiber. Refractive indexes of a fiber core of the few-mode doped fiber are distributed to be gradient along a radial direction of a cross section, the fiber core is etched with periodic gratings along an axial direction, and periods of the gratings satisfy a phase matching condition. The use of the periodic gratings in the few-mode doped fibers makes optical signal modes strongly coupled and co-amplified, thereby reducing a differential gain between mode groups.

In a possible design, that periods of the gratings satisfy a phase matching condition specifically includes that a product of each of the periods of the plurality of gratings and an effective refractive index difference between adjacent mode groups of the few-mode signal light is equal to a wavelength of the few-mode signal light. The adjacent mode groups of the few-mode signal light are two adjacent mode groups of a plurality of mode groups that are included in the signal light and that are sequentially arranged based on corresponding effective refractive indexes. Such a mode strong coupling manner is widely applicable to a few-mode fiber with a gradient refractive index, which improves wide application.

In another possible design, the refractive indexes of the fiber core of the few-mode doped fiber are distributed to be gradient along the radial direction of the cross section so that effective refractive index differences between adjacent mode groups are equal to each other, and the periods of the plurality of gratings are equal to each other. Such a characteristic enables all adjacent mode groups to have a same effective refractive index difference, and therefore gratings etched with a single periodic structure can be used, which lowers a requirement for the gratings and reduces manufacturing costs.

In yet another possible design, a fiber core region of the few-mode doped fiber is doped with rare earth element ions. This achieves an amplification gain of signals with different wavelengths.

In still yet another possible design, the fiber core region is doped with rare earth element ions in a manner of uniform doping or layered doping.

In a further possible design, the fiber core of the few-mode doped fiber uses a silicon dioxide material doped with germanium dioxide, and a cladding layer uses a silicon dioxide material; or the fiber core uses a silicon dioxide material, and a cladding layer uses silicon dioxide doped with fluoride. Therefore, refractive index differences between mode groups are equal to each other.

In a still further possible design, a periphery of the fiber core of the few-mode doped fiber further includes an inner cladding layer, a trench layer, and an outer cladding layer, and a refractive index of the trench layer is less than refractive indexes of the inner cladding layer and an outer cladding layer. Such a manner equivalently reduces a refractive index of the cladding layer, and has an effect of restricting a light field, so that modes are more concentrated within the fiber core, to lower coupling with a cladding layer mode and reduce a bending loss.

In a yet further possible design, the periphery of the fiber core of the few-mode doped fiber is provided with a plurality of air holes. The air holes are more effective in restricting the light field.

In a still yet further possible design, the few-mode doped fiber includes a plurality of fiber cores, which use a fiber core pumping manner, and the pump light is injected into each fiber core. Therefore, a light field overlap between the pump light and the signal light is effectively achieved, and gain improvement and gain balance of the fiber cores are achieved.

In even yet another possible design, the few-mode doped fiber includes a plurality of fiber cores, which use a cladding layer pumping manner, the cladding layer includes a pumping region, and the pump light is injected into the pumping region. The cladding layer pumping manner has a simple structure and can also achieve gain balance of the fiber cores.

In even yet another possible design, the fiber amplifier further includes an optical splitter, configured to separate the signal light and the pump light output by the few-mode doped fiber, and input separated pump light into the pump and signal combiner. In this way, the pump light is fully utilized, and a gain of each mode signal light is further improved.

In even yet another possible design, the fiber amplifier further includes a first isolator and a second isolator, the first isolator is connected to an input end of the pump and signal combiner, and the second isolator is connected to an output end of the few-mode doped fiber. In this way, backscattered light is prevented from entering a fiber link, thereby improving optical signal transmission quality.

According to the foregoing technical solutions provided in embodiments of the present invention, the few-mode doped fiber with the periodic gratings are used in the amplifier, so that strong coupling and co-amplification are achieved between optical signal modes, thereby reducing a differential gain and a noise figure difference between mode groups, and facilitating long-distance transmission of optical signals.

BRIEF DESCRIPTION OF DRAWINGS

FIG. 3$b$ is a schematic diagram of a cross-sectional refractive index distribution of a few-mode doped fiber according to an embodiment of the present invention;

FIG. 4$b$ is a schematic diagram of a cross-sectional refractive index distribution of another few-mode doped fiber according to an embodiment of the present invention;

FIG. 5$(a)$, FIG. 5$(b)$, and FIG. 5$(c)$ are schematic diagrams of cross-sectional structures of doped fiber cores according to an embodiment of the present invention;

FIG. 7$(a)$ and FIG. 7$(b)$ are curve diagrams of change of a DMG with coupling strength and a number of coupling points under uniform doping according to an embodiment of the present invention;

FIG. 11$b$ is a schematic diagram of a cross-sectional refractive index distribution along a radial direction of a groove-assisted fiber according to an embodiment of the present invention;

DESCRIPTION OF EMBODIMENTS

To make objectives, technical solutions, and advantages of the present invention clearer, the following further describes implementations of the present invention in detail with reference to accompanying drawings.

Figure 1:
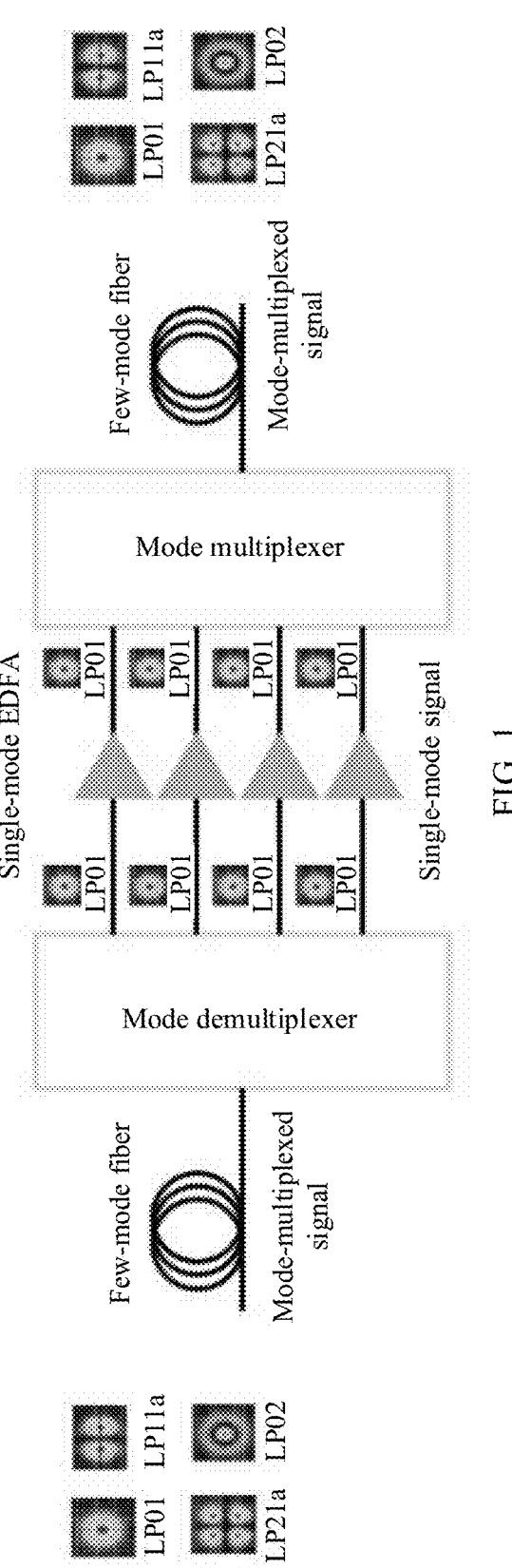
FIG. 1 is a schematic diagram of a structure of a fiber amplifier in the conventional technology.
Figure 2:
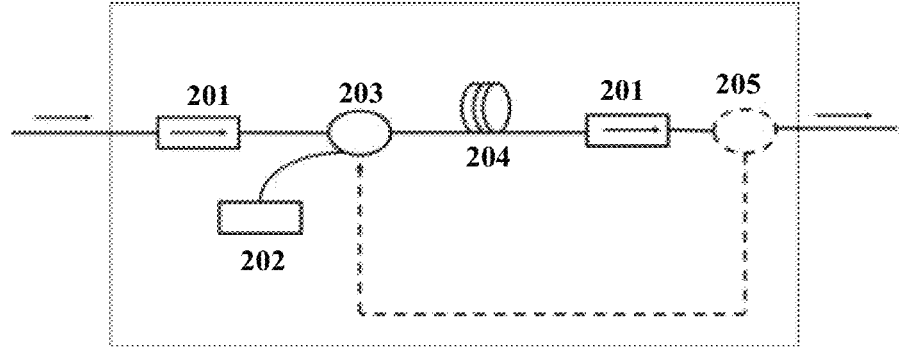
FIG. 2 is a schematic diagram of a structure of a spatial division multiplexing fiber amplifier according to an embodiment of the present invention.

An embodiment of the present invention provides a strong-coupling spatial division multiplexing fiber amplifier, which, as shown in FIG. 2, includes two optical isolators 201, a pump laser 202, a pump and signal combiner 203, and a few-mode doped fiber 204. The two optical isolators 201 are respectively located at an input end and an output end of the fiber amplifier, and are configured to prevent backscattered light from entering a fiber link and affecting optical signal transmission quality. The pump laser 202 is configured to output pump light. The pump and signal combiner 203 is configured to couple few-mode signal light and the pump light at the input end into the output end. The few-mode doped fiber 204 is configured to implement strong coupling and co-amplification between signal modes, so as to reduce a differential gain between the mode groups.

In FIG. 2, signal light entering the fiber amplifier includes M mode groups, and M is an integer greater than or equal to 2. The mode group is a group including a plurality of modes with a consistent propagation constant in a fiber, and rates of a plurality of modes in a mode group are equal to each other. For example, the input signal light includes four mode groups LP01, LP11, LP21, and LP02, and each mode group carries different information. After passing through the optical isolator 201, the signal light is simultaneously coupled together with the pump light by the pump and signal combiner 203 into the few-mode doped fiber 204. In the few-mode doped fiber 204, a fiber core region is doped with rare earth element ions of a particular concentration. The ion is raised from a low energy level to a high energy level under the action of the pump light and is in an excited state. When returning to a base state under the action of incident signal light, a particle at the high energy level emits a photon with a same frequency as the signal light, so that the signal light is amplified. In addition, each mode group in the signal light obtains a same gain. Signal light amplified by the few-mode doped fiber 204 is output through the optical isolator.

A gain spectrum range of the few-mode doped fiber is determined by a type of doped ions in the fiber core region. For example, a gain band range corresponding to doping with ytterbium ions $Yb^{3+}$ is from 970 nm to 1200 nm. Other rare earth element ions and their corresponding gain spectrum ranges include: praseodymium ions $Pr^{3+}$ (amplifying a band around 1300 nm), neodymium ions $Nd^{3+}$ (amplifying a band around 1300 nm), and erbium ions $Er^{3+}$ (amplifying a band of 1520 nm to 1625 nm), bismuth ions $Bi^{3+}$ (amplifying a band of 1300 nm to 1380 nm), and thulium ions $Tm^{3+}$ (amplifying a band of 1450 nm to 1520 nm and a band of 1900 nm to 2000 nm).

The few-mode fiber amplifier may further include a reusable pump structure, configured to collect residual pump light energy and reuse the residual pump light energy, thereby greatly improving pump light utilization and improving a signal light amplification gain. As shown in FIG. 2, 205 is a pump and signal splitter. The few-mode signal light amplified by the few-mode doped fiber 204 and the residual pump light enter the component 205, and the signal light and the pump light are separated in the pump and signal splitter. The amplified signal light enters a next transmission link. The residual pump light and the pump light emitted by the pump laser 202 are both input to the pump and signal combiner 203 for a new round of amplification. In this way, the pump light is fully utilized, and a gain of each mode signal light is further improved.

Figure 3A:
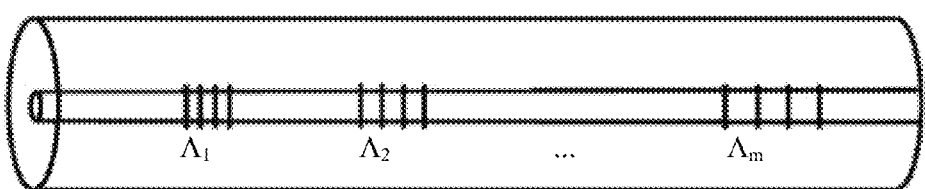
FIG. 3$a$ is a schematic diagram of a structure of a few-mode doped fiber in a fiber amplifier according to an embodiment of the present invention.
Figures 3B, 4A:
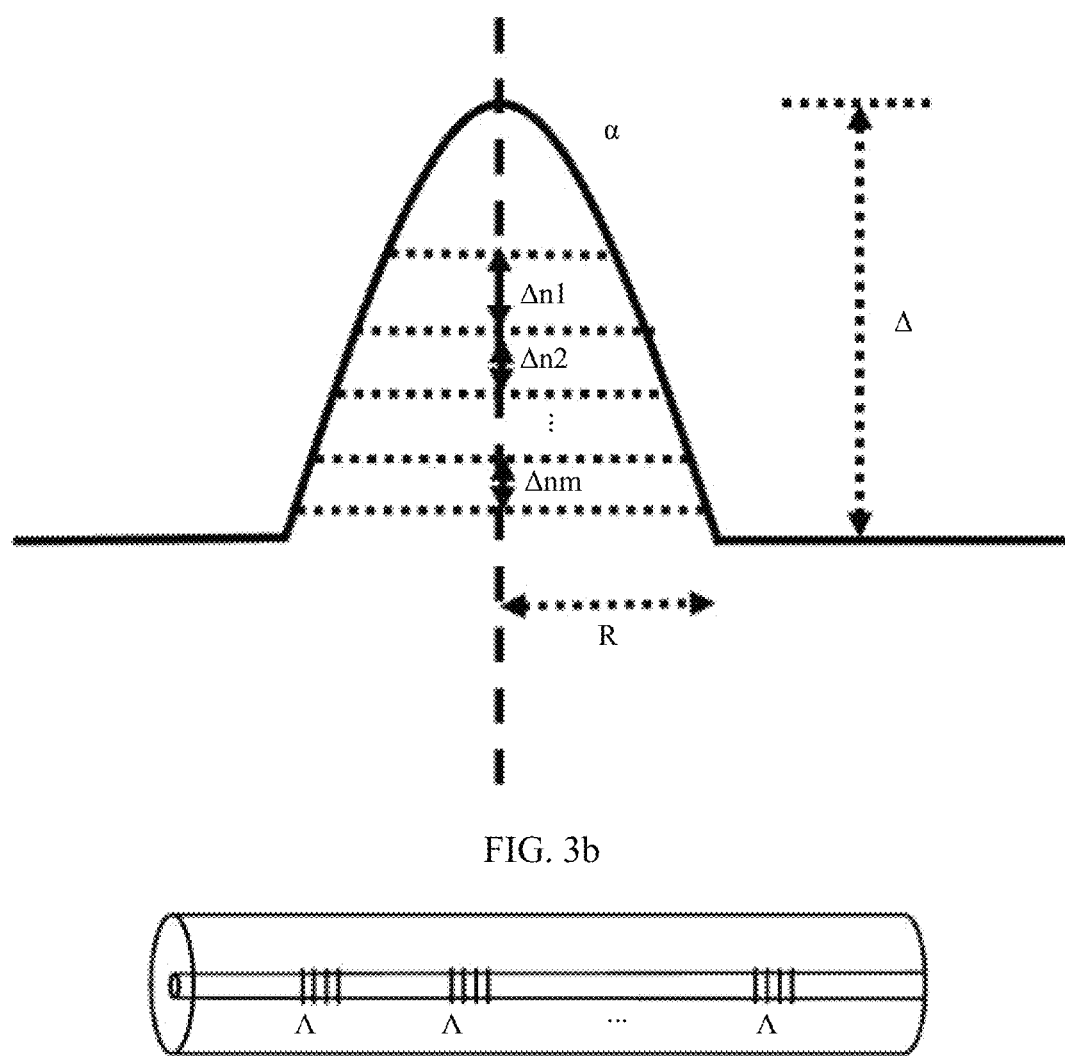
FIG. 4$a$ is a schematic diagram of a structure of a few-mode doped fiber in another fiber amplifier according to an embodiment of the present invention.

To enhance spatial channel coupling of modes in a fiber, in this embodiment of the present invention, a fiber core of the few-mode doped fiber in the fiber amplifier is etched with gratings. FIG. 3a is a schematic diagram of a few-mode doped fiber in a fiber amplifier according to an embodiment of the present invention, where a fiber core is at the center, and a cladding layer is outside the fiber core. A plurality of periodic gratings are distributedly etched along an axial direction of the few-mode doped fiber. A phase matching condition needing to be satisfied by periods of the gratings are described as follows:

Refractive indexes of the fiber core of the few-mode doped fiber are gradient along a radial direction. FIG. 3b is a schematic diagram of a cross-sectional refractive index distribution of a few-mode doped fiber, where $\Delta$ is a refractive index difference between the center of a fiber core and a cladding material (generally $\Delta \in [0.001, 0.030]$), R is a radius of the fiber core (generally $R\Delta \in [2, 35]$ um), and $\alpha$ is a gradient index of a refractive index ($\alpha \in [1, \infty]$). It is assumed that the fiber supports transmission with M mode groups, and different mode groups have different effective refractive indexes. Effective refractive indexes of different mode groups are arranged, with a largest mode group arranged in the front as a first mode group, and with other mode groups arranged in descending order of effective refractive indexes. An effective refractive index difference between adjacent mode groups is set to $\Delta n$. For example, $\Delta n1$ is an effective refractive index difference between the first mode group and a second mode group, $\Delta n2$ is an effective refractive index difference between the second mode group and a third mode group, and $\Delta nm$ is an effective refractive index difference between an $m^{th}$ mode group and an $(m+1)^{th}$ mode group. Generally, $\Delta nm \in [1*10^{-5}, 8*10^3]$, and m ranges from 1 to (M−1).

In accordance with a characteristic of the refractive index of the fiber, a plurality of periodic gratings are distributedly etched along the axial direction of the fiber, so that a refractive index distribution of the fiber changes periodically. As shown in FIG. 3a, corresponding to the M−1 effective refractive index differences between adjacent mode groups, at least M−1 sections of periodic gratings are etched on the fiber, where $\Lambda 1$ is a period of a first grating, $\Lambda 2$ is a period of a second grating, and $\Lambda m$ is a period of an $m^{th}$ grating. The period of the grating needs to satisfy the phase matching condition, that is, a product of the effective refractive index difference between adjacent mode groups is equal to a wavelength of few-mode signal light. In other words, the period $\Lambda m$ of the grating is: $\Lambda m = \lambda / \Delta nm$, where $\lambda$ is the wavelength of the light wave. In this way, strongest coupling is generated between specific adjacent mode groups. When the few-mode signal light is amplified, adjacent mode groups are amplified together, so that an amplification gain difference between mode groups is greatly reduced.

For example, in the case of four mode groups, after the fiber is etched with gratings, a coupling degree between adjacent mode groups, including between LP01 and LP11, between LP11 and LP21, and between LP21 and LP02, is greatly enhanced.

A manner of etching the few-mode doped fiber with the periodic gratings is as follows: a carbon dioxide ($CO_2$) laser is used to etch the few-mode doped fiber point by point with the periodic gratings. Laser light emitted by the $CO_2$ laser is focused on the fiber core of the few-mode doped fiber by a microscope objective lens, and a refractive index change is introduced at a contact position between the laser light and the fiber due to a thermal effect. The few-mode doped fiber is fixed on a high-precision three-dimensional moving platform. The three-dimensional moving platform is used to control the fiber to move at a specific stepping speed for point-by-point exposure until the entire grating is etched. A stepping speed, laser energy, and an exposure time of the fiber are determined based on an etching period and a duty cycle of the gratings.

In the embodiments corresponding to FIG. 3a and FIG. 3b, a manner of strong coupling between modes is widely applicable to a few-mode fiber with a gradient refractive index. When a quantity M of mode groups M is relatively large, there are M−1 effective refractive index differences between adjacent mode groups. Correspondingly, the fiber needs to be etched with M−1 long-period gratings, which raises a requirement for the grating and increases manufacturing costs.

FIG. 4a is a schematic diagram of another few-mode doped fiber in a fiber amplifier according to an embodiment of the present invention. In this embodiment, it is designed that effective refractive index differences between adjacent mode groups are equal to each other in a fiber core of the few-mode doped fiber. In this case, according to the foregoing formula $\Lambda m = \lambda / \Delta nm$, periods of sections of gratings are also the same.

Figures 4B, 5A, 5B, 5C, 6:
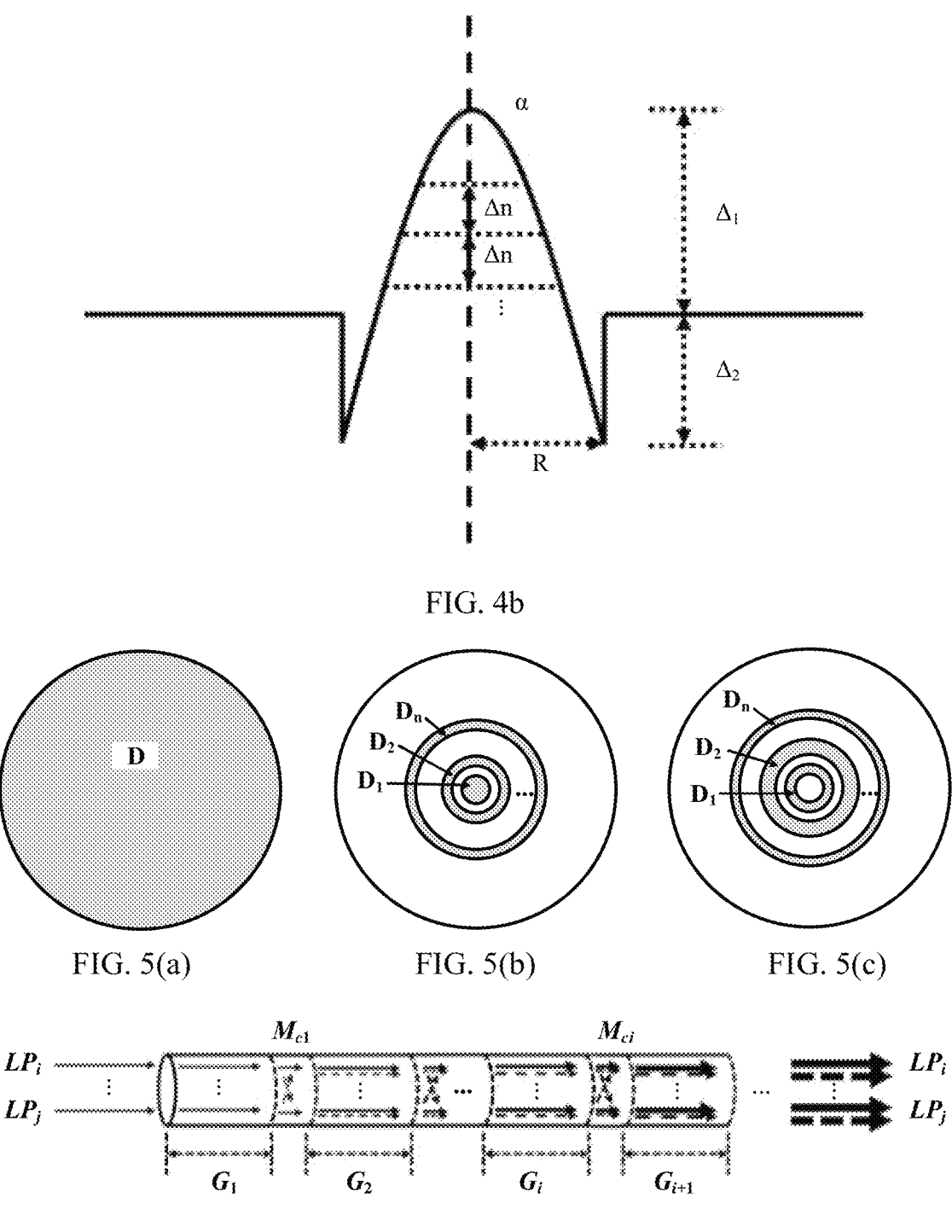
FIG. 6 is a schematic diagram of a model of an erbium-doped fiber according to an embodiment of the present invention.

FIG. 4b is a schematic diagram of a cross-sectional refractive index distribution of a few-mode doped fiber according to this embodiment, where a refractive index gradient distribution curve of the fiber core satisfies $n(r)^2 = n1^2(1 - 2\Delta(r/R)\alpha)$. r is a specific radial position in the fiber core, $n(r)$ is a refractive index at the radial position r, and n1 is a refractive index of the fiber core. $\Delta = \Delta 1 + \Delta 2$, $\Delta 1$ is a refractive index difference between the center of the fiber core and a cladding material, and $\Delta 2$ is a refractive index difference between the trench layer and a cladding layer. R is a radius of the fiber core, $\alpha$ is a gradient index of a refractive index, and when $\alpha = 2$, a refractive index distribution curve of the fiber core is parabolic. For a light field distribution of a plurality of mode groups in a fiber core region, the following fiber parameters are designed: n1, $\Delta 1$, $\Delta 2$, R, $\alpha$, and the like, so that effective refractive index differences $\Delta nm$ of adjacent mode groups are equal to each other.

In accordance with a characteristic of the refractive index of the fiber, a plurality of periodic gratings are distributedly etched along the axial direction of the fiber, so that a refractive index distribution of the fiber changes periodically. As shown in FIG. 4a, because M−1 effective refractive index differences between adjacent mode groups are equal to each other, during etching of periodic gratings on the fiber, the period A of the grating needs only to satisfy a phase matching condition: $\Lambda m=\lambda/\Lambda nm$, where $\lambda$ is a wavelength of a light wave. In this way, strongest coupling is generated between adjacent mode groups. When few-mode signal light is amplified, adjacent mode groups are amplified together, so that an amplification gain difference between mode groups is greatly reduced.

To achieve equal refractive index differences between mode groups, a silicon dioxide material doped with germanium dioxide can be used as the fiber core, and the cladding layer uses a silicon dioxide material. The refractive index of the fiber core can be improved by doping germanium dioxide. During a process of fiber core preparation, a shape of refractive index profile in the fiber core region is adjusted by designing a concentration distribution of germanium dioxide in the fiber core region, so that the design is consistent with a theoretical design. Further, rare earth element ions are uniformly doped or layeredly doped (sometimes also referred to as ring-doped) in the fiber core region, and then a fiber preform is drawn into a fiber.

FIG. 5(a), FIG. 5(b), and FIG. 5(c) are schematic diagrams of cross-sectional structures of fiber cores, where a doped part is indicated in gray. FIG. 5(a) represents a uniform doping structure. FIG. 5(b) and FIG. 5(c) represent layered doping structures. FIG. 5(b) is a layered doping structure with the center doped. FIG. 5(c) is a layered doping structure with the center undoped. A layer quantity n of the layered doping structure may be any natural number, and is usually less than 15. In addition, doping concentration of each layer of doping region may vary, and each layer of doping region may be in a step distribution or gradient distribution.

It can be learned from engineering practice that a tolerance of an effective refractive index difference $\Delta nm$ between adjacent mode groups of the fiber core is controlled within a range of ±5%, and the fiber is etched with gratings with a same period, so that strong coupling can be achieved. To be specific, an actual value $\Delta nmR$ of the effective refractive index difference of adjacent mode groups is controlled within a 5% error range of a designed value $\Delta nmD$: $\Delta nmR \in$ [95%*$\Delta nmD$, 105%*$\Delta nmD$]. An actual period of the etched grating is: $\Lambda m=\lambda/\Delta nmR$.

Usually, a fiber 204 in the fiber amplifier is relatively short, and a length of the fiber 204 generally ranges from 5 meters to 120 meters. Correspondingly, for a uniformly doped fiber, it is more suitable that a strength range of the etched grating is $\Delta ng \in [4*10^{-7}, 3*10^{-2}]$. For a layeredly doped fiber, it is more suitable that a strength range of the etched grating is $\Delta ng \in [1*10^{-6}, 3*10^{-2}]$. For details, refer to subsequent description.

A manner of etching periodic gratings is previously described. In the embodiment shown in FIG. 4a and FIG. 4b, a characteristic of the refractive index of the fiber enables all adjacent mode groups to have a same effective refractive index difference, and therefore gratings etched with a single periodic structure can be used, which lowers a requirement for the gratings and reduces manufacturing costs.

For the few-mode doped fiber and the amplifier in the foregoing embodiment, amplification performance of the strong-coupling few-mode doped fiber can be assessed by using numerical simulation, to further guide fiber design. For example, a transfer-matrix solution method is a method for relatively accurately calculating a gain of each mode in a spatial division multiplexing few-mode fiber amplifier. A transfer matrix of signal light passing through the amplifier is solved, singular value decomposition is performed on the transfer matrix, and a calculated square of an obtained matrix norm is a mode gain of a corresponding mode.

FIG. 6 is a diagram of a model of a strong-coupling spatial division multiplexing few-mode fiber amplifier according to an embodiment of the present invention. An erbium-doped fiber in the amplifier is divided into K independent amplification sections. Distributed strong coupling may be represented by a random coupling matrix between every two independent amplification sections. In this case, a transmission matrix M is as follows:

$$M=G_K \ldots G_{i+1}M_{ci}G_i \ldots G_2M_{c1}G_1 \tag{1}$$

$G_i$ represents a gain matrix of an $i^{th}$ section, and $M_{ci}$ represents an inter-mode random coupling matrix. The matrix M includes all inter-mode coupling paths, and singular value decomposition is performed on M.

$$M = V \cdot S \cdot U^* \tag{2}$$

$$S = \mathrm{diag}\left(e^{\frac{1}{2}g_1}, e^{\frac{1}{2}g_2} \ldots e^{\frac{1}{2}g_N}\right) \tag{3}$$

V and U respectively represent equivalent mode coupling at an input end and equivalent mode coupling at an output end, and N represents a mode quantity. Elements of an obtained target vector $g=(g_1, g_2 \ldots g_N)$ are logarithms of eigenvalues of $M \cdot M^*$, namely, gains of N modes. Therefore, a differential mode gain DMG can be denoted as:

$$DMG=\max(g_n)-\min(g_n) \tag{4}$$

$\max(g_n)$ and $\min(g_n)$ respectively represent maximum and minimum mode gains.

The following first discusses a uniformly doped fiber core. It is assumed that input signal light includes four mode groups LP01, LP11, LP21, and LP02, and basic parameters of the fiber in the amplifier are used as follows: A radius R of the fiber core is 8 micrometers, a numerical aperture NA is equal to 0.15, a fiber length is 12 meters, and concentration of erbium ion doping was 100 ppm. When there is no mode coupling, that is, no grating is etched, a maximum differential mode gain DMG between the four mode groups of the fiber is 9.3 dB.

Figures 7A, 7B, 8:
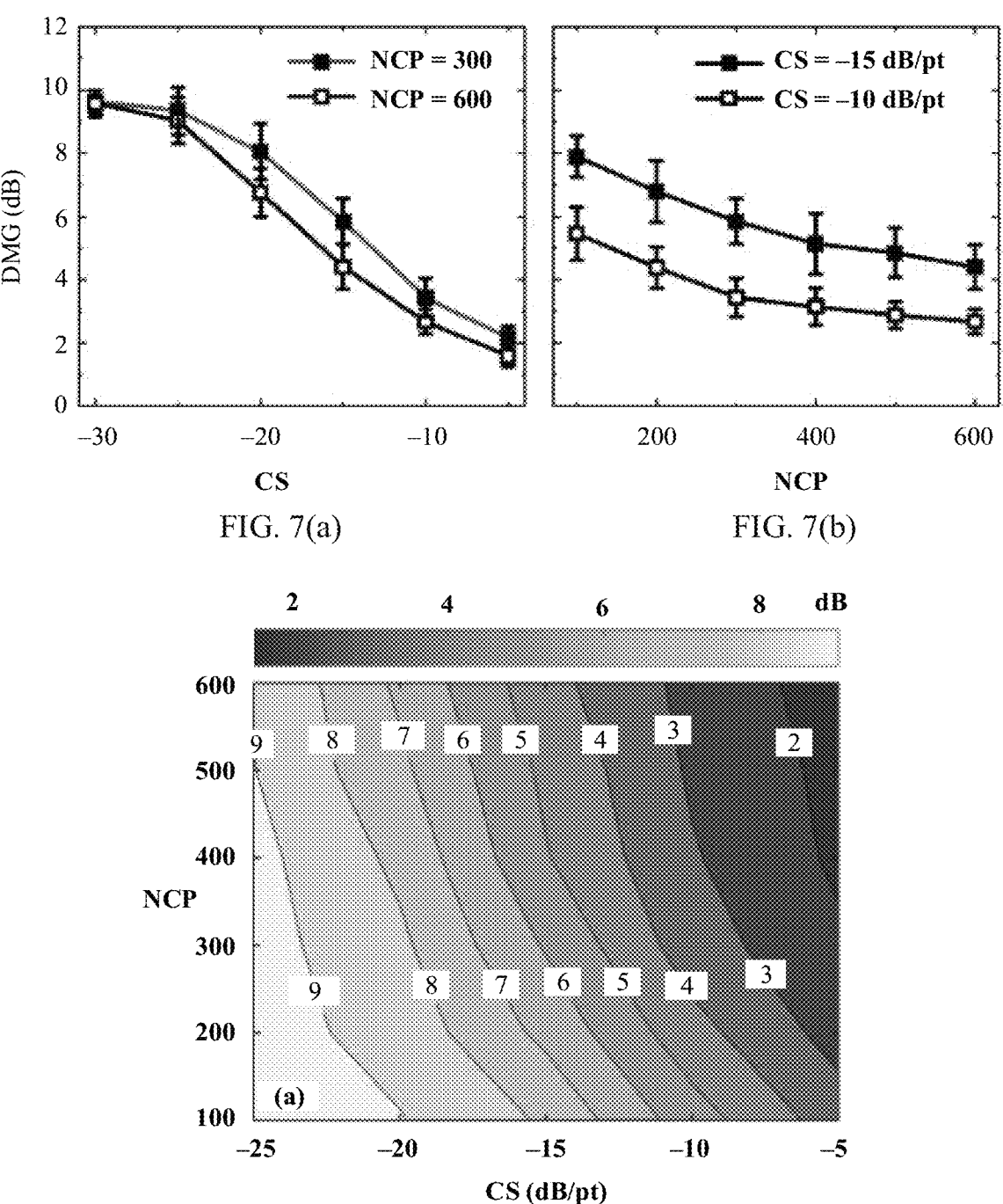
FIG. 8 is a contour line diagram of a DMG with coupling strength and a number of coupling points under uniform doping according to an embodiment of the present invention.

Introduction of strong coupling, namely, etching with gratings, can greatly improve the DMG. A magnitude of coupling strength is represented by both a number of coupling points (NCP) and single-point coupling strength (CS). FIG. 7(a) and FIG. 7(b) show curves of change of the DMG with the coupling strength and the number of coupling points under a condition of uniform doping. In the left curve FIG. 7(a), a horizontal coordinate represents the coupling strength CS expressed in a unit of dB/coupling point (pt), and a vertical coordinate is the DMG expressed in a unit of dB. It can be learned from the curve FIG. 7(a) that when the number of coupling points NCP is fixed at 300, the DMG decreases by 7.5 dB from 9.6±0.3 dB to 2.1±0.3 dB with the increase of the coupling strength CS. Similarly, when the number of coupling points is 600, it is found that the DMG decreases by 8.3 dB. In the right curve FIG. 7(b), a horizontal coordinate represents the number of coupling points NCP, and a vertical coordinate represents the DMG expressed in a unit of dB. It can be learned from the curve b that, when the coupling strength is fixed at −15 dB/pt and the number of coupling points is increased, the DMG decreases from 7.9±0.6 dB to 4.4±0.7 dB. With the increase of the coupling strength, the DMG roughly decreases, especially for a relatively large number of coupling points. Due to randomness of the coupling itself, from extremely weak coupling to extremely strong coupling, although a value of the DMG roughly decreases, a standard difference first increases and then decreases in terms of fluctuation. This fluctuation may result in a higher value of the DMG when the coupling is relatively strong, as shown by a position of CS=−25 dB/pt in FIG. 7(a). It should be noted that, as can be seen from subsequent description, this phenomenon also occurs in the case of the layeredly doped fiber core. Therefore, in order to obtain an optical amplifier with a low DMG and stable performance, relatively large coupling strength is generally required.

It can be learned from FIG. 7(a) and FIG. 7(b) that, under a condition that the coupling strength is greater than −20 dB/pt and the number of coupling points is greater than 200, the value of the DMG starts to decrease, that is, a characteristic of the DMG of the fiber amplifier starts to improve. With reference to a strong coupling effect brought by the long-period grating, when grating strength is $\Delta ng=1*10^{-6}$, a fiber with a length of 22.5 cm (cm) can achieve 1% mode power coupling, which is −20 dB distributed coupling strength. The coupling strength is inversely proportional to a grating length. Therefore, when the grating strength is $\Delta ng=4*10^{-6}$, a fiber with a length of 6 cm can achieve −20 dB mode coupling, that is, achieve the foregoing single-point coupling strength of −20 dB/pt with the number of coupling points of 200. In addition, considering that a length L of the erbium-doped fiber is generally from 5 m to 120 m, with reference to a strength threshold parameter of the grating etched by the $CO_2$ laser, a strength lower limit of the grating is $4*10^{-7}$. In addition, in order not to damage a transmission condition of the fiber itself, a strength upper limit of the grating is $3*10^{-2}$. In conclusion, for the strong-coupling spatial division multiplexing fiber amplifier proposed in this patent, it is more suitable that a value of the grating strength is $\Delta ng \in [4*10^{-7}, 3*10^2]$.

Because the number of coupling points and the coupling strength have significant impact on the DMG, to improve performance of the fiber amplifier, the two important parameters need to be scanned and optimized. In the case of uniform doping, an example in which the DMG changes with the number of coupling points and the coupling strength is shown in FIG. 8. It should be noted that even if the number of coupling points and the coupling strength are fixed, the DMG still changes due to randomness of a single-point coupling matrix and positions of the coupling points. Therefore, in the example of FIG. 8, each number of coupling points and corresponding coupling strength are calculated for 100 times, and their DMGs are averaged to obtain the contour line diagram of FIG. 8. In FIG. 8, a horizontal coordinate represents the coupling strength CS expressed in a unit of dB/pt, a vertical coordinate represents the number of coupling points NCP, and contour lines with different color depths represent the DMGs expressed in a unit of dB. It can be learned from FIG. 8, for a uniformly doped strong-coupling few-mode fiber amplifier, after introduction of strong coupling, the DMG can be significantly reduced by 7.6 dB, that is, from 9.3 dB to 1.7 dB. This is a result of optimization of both transverse and longitudinal structures of the erbium-doped fiber.

Figure 9:
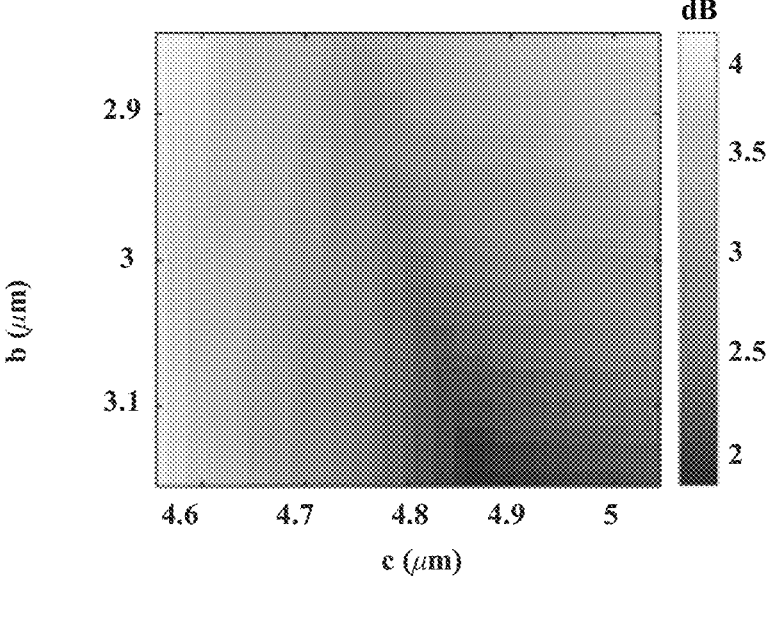
FIG. 9 is a two-dimensional diagram of a change relationship between a DMG and layered doping parameters b and c according to an embodiment of the present invention.

In the case of a layeredly doped fiber core, it is assumed that input signal light includes four mode groups LP01, LP11, LP21, and LP02, and basic parameters of the fiber in the amplifier are used as follows: A radius R of the fiber core is 8 micrometers, a numerical aperture NA is equal to 0.15, and a fiber length is 12 meters. In the case of layered doping, numerical optimization can be performed on doping concentration and a size of each layer, to obtain a relatively balanced mode-dependent gain. The layered doping structure with the center of the fiber doped, shown in FIG. 5(b), is used as an example. It is assumed that two layers are doped, a radius b of a first doping region (namely, the central doping region) is 3 μm, and the doping concentration is 65 ppm. No doping is provided beyond the radius of 3 μm, and an undoped width i1 is 1.8 μm. A second doping region starts from a boundary c=b+i1=4.8 μm and extends to a boundary 8 μm of the fiber core, and the doping concentration is 115 ppm. In this layered doping, the DMG is 2.4 dB when there is no mode coupling. The foregoing layered doping fiber parameters are obtained by optimizing doping region parameters in the case of no coupling. FIG. 9 is a two-dimensional diagram of a relationship of change of a DMG with the layered doping parameters b and c. The horizontal coordinate c represents a distance between a start boundary of the second doping region and the fiber core, which is expressed in a unit of micron (μm). The vertical coordinate b represents a radius of the first doping region, which is expressed in a unit of micron (μm). A difference between color depths indicates the DMG, and is expressed in a unit of dB. It can be learned that impact of jitters of b and c at a particular level caused due to a production process on the DMG is little in the case of no coupling.

Figure 10:
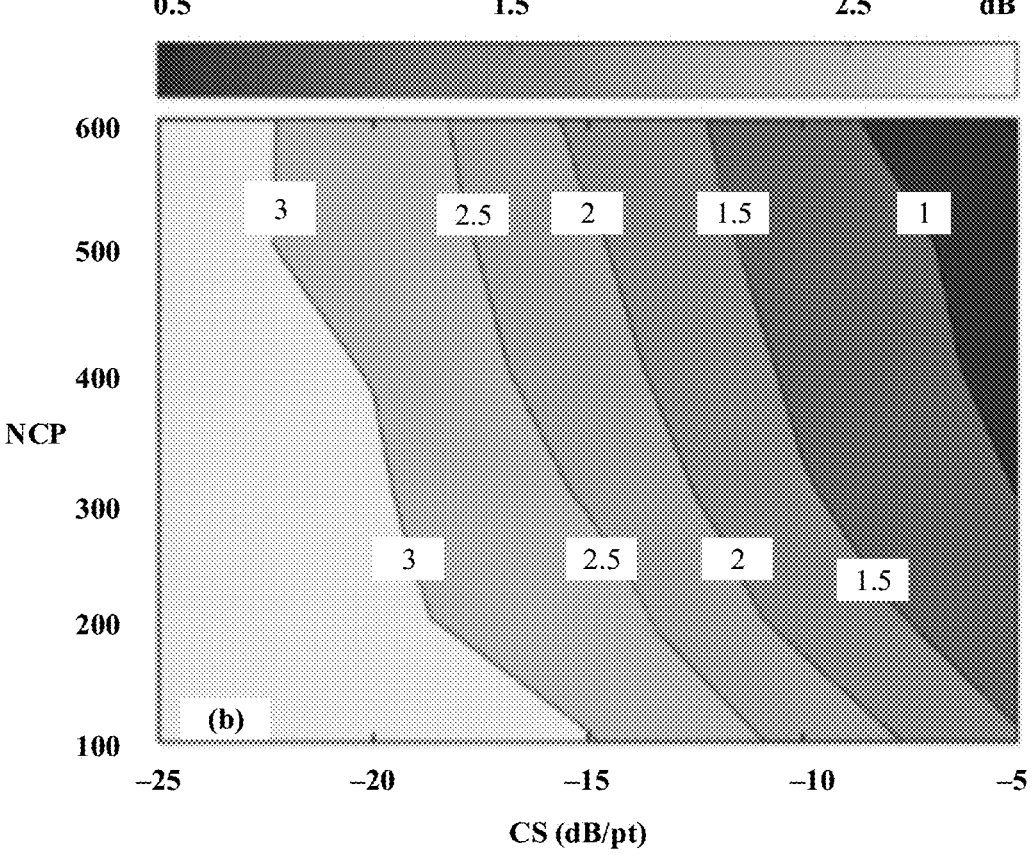
FIG. 10 is a contour line diagram of a DMG with coupling strength and a number of coupling points under layered doping according to an embodiment of the present invention.

Introduction of strong coupling, namely, etching with gratings, can greatly improve the DMG. A magnitude of coupling strength is represented by both a number of coupling points (NCP) and single-point coupling strength (CS). Similarly, in order to obtain an optical amplifier with a low DMG and stable performance, a relatively large coupling strength is generally required. Because the number of coupling points and the coupling strength have significant impact on the DMG, to improve performance of the fiber amplifier, the two important parameters need to be scanned and optimized. In the case of layered doping, an example in which the DMG changes with the number of coupling points NCP and the single-point coupling strength CS is shown in FIG. 10. Similarly, even if the number of coupling points and the coupling strength are fixed, the DMG still changes due to randomness of a single-point coupling matrix and positions of the coupling points. Therefore, in the example of FIG. 10, each number of coupling points and corresponding coupling strength are calculated for 100 times, and their DMGs are averaged to obtain the contour line diagram of FIG. 10. In FIG. 10, a horizontal coordinate represents the coupling strength CS expressed in a unit of dB/pt, a vertical coordinate represents the number of coupling points NCP, and contour lines with different color depths represent the DMGs expressed in a unit of dB. It can be learned that, for a layeredly doped strong-coupling few-mode fiber amplifier, after introduction of strong coupling, the DMG can be significantly reduced from 3.2 dB to 0.5 dB. This is a result of optimization of both transverse and longitudinal structures of an erbium-doped fiber.

It can be learned from the contour line diagram of the layered doping that under a condition that the CS is greater than −15 dB/pt and the NCP is greater than 300, an average value of the DMG begins to decrease. These parameters are used as a critical point of coupling strength required for layered doping. When grating strength is $\Delta ng=1*10^{-6}$, a fiber with a length of 40.1 cm can achieve 3.2% mode power coupling, namely, −15 dB distributed coupling strength. When the grating strength is $\Delta ng=1*10^{-5}$, a fiber with a length of 4 cm can achieve −15 dB mode coupling. Similarly, considering that a length range of the erbium-doped fiber is 5 m to 120 m, and a lower limit of the grating strength is $1*10^{-6}$, it is more suitable that the grating strength is $\Delta n g \in [1*10^{-6}, 3*10^{-2}]$.

Generally, the layered doping has a higher requirement on the coupling strength, and a suitable range ($[1*10^{-6}, 3*10^{-2}]$) of the grating strength for the layered doping is included in the suitable range ($[4*10^{-7}, 3*10^{2}]$) of the grating strength for the uniform doping. It should be noted that the foregoing grating strength is a result of the required grating strength calculated with the parameters b and c fixed, and if the parameters b and c are changed, the DMG ranges from 2.4 to 9.3 dB in the case of no coupling. The lower limit used for the grating strength should also range from $4*10^{-7}$ to $1*10^{-6}$.

In addition, a noise figure (NF) is also an important indicator for measuring a spatial division multiplexing fiber amplifier. In a transmission system, a smaller noise figure difference between modes better helps improve transmission performance. The strong-coupling spatial division multiplexing fiber amplifier proposed in the embodiments of the present invention can reduce the NF to an extent. The NF can be expressed by using the following formula:

$$NF_i = \frac{P_{ASE\_i}}{hv\Delta vg_i} + \frac{1}{g_i}$$

$g_i$ and $P_{ASE\_i}$ respectively represent a mode gain and an ASE noise power of an $i^{th}$ mode group. It can be learned from the above that a difference of a gain $g_i$ between modes decreases to an extent, and the strong coupling makes ASE noise powers of the modes tend toward a same value. Therefore, in the strong-coupling spatial division multiplexing fiber amplifier proposed in the embodiments of the present invention, an NF difference between modes is relatively small.

In the embodiments of the present invention, in addition to consideration of the fiber core refractive index and grating structure parameters of the few-mode doped fiber, a peripheral structure of the fiber core such as trench assistance or air hole assistance can be introduced to further adjust a mode light field distribution.

Figure 11A:
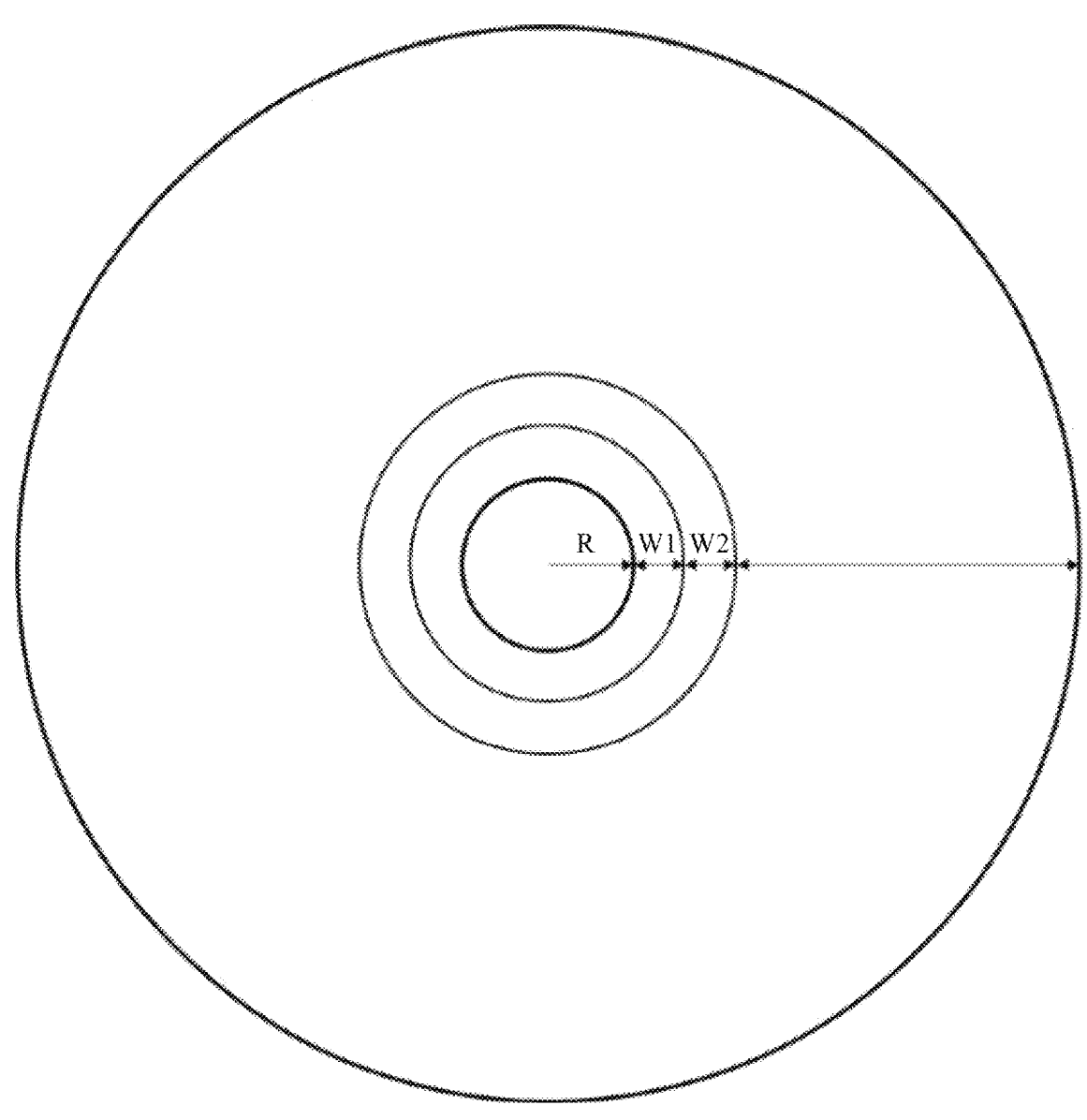
FIG. 11$a$ is a schematic diagram of a cross-sectional structure of a trench-assisted fiber according to an embodiment of the present invention.
Figure 11B:
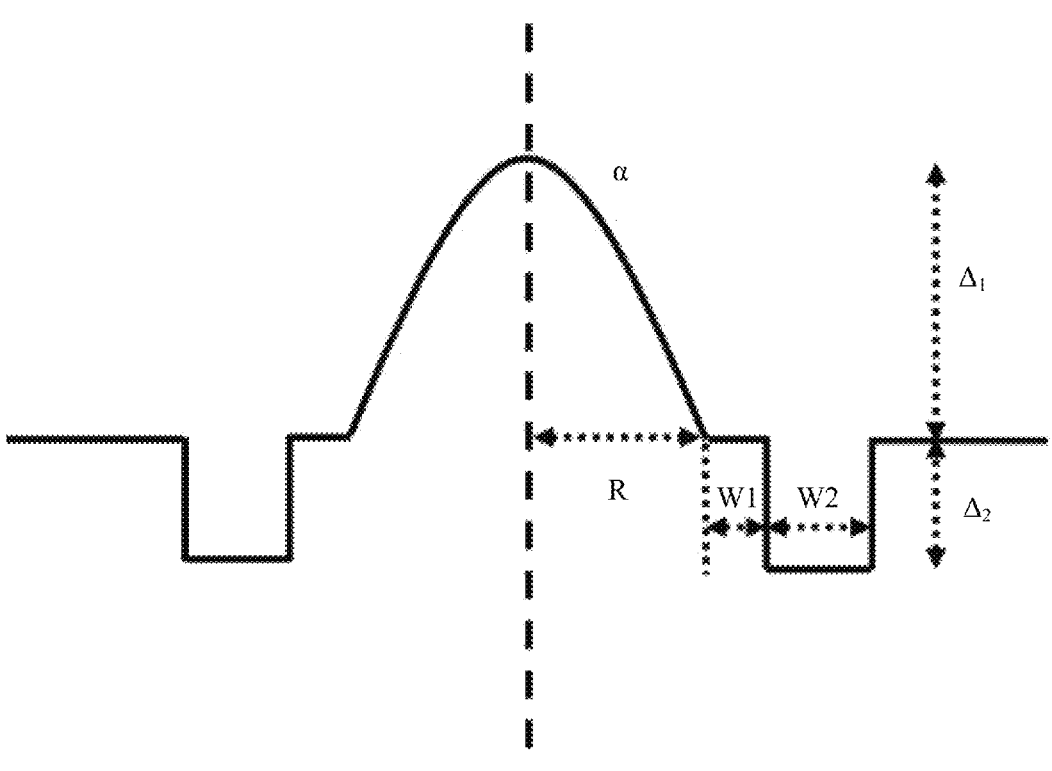

FIG. 11a is a schematic diagram of a cross-sectional structure of a trench-assisted fiber. FIG. 11b is a schematic diagram of a cross-sectional refractive index distribution of this fiber along a radial direction. A peripheral cladding layer of a fiber core includes an inner cladding layer and an outer cladding layer, and a trench layer is sandwiched between the inner cladding layer and the outer cladding layer, where R is a radius of the fiber core, W1 is a width of the inner cladding layer, and a value of W1 is generally less than or equal to R/2, so as to bind a mode group within the fiber core. W2 is a width of the trench layer, and a refractive index of the trench layer is less than those of the inner cladding layer and the outer cladding layer. Δ1 is a refractive index difference between the center of the fiber core and the cladding layer, Δ2 is a refractive index difference between the trench layer and the cladding layer, and a is a gradient index of a refractive index. Considering a fiber fabrication process, a wider trench indicates larger Δ2 and a higher manufacturing cost. A value range of W2 is generally less than or equal to the radius R of the fiber core, and Δ2 is generally not greater than 0.0045.

The introduction of the trench equivalently reduces the refractive index of the cladding layer, and has an effect of restricting a light field, so that modes are more concentrated within the fiber core, to lower coupling with a cladding layer mode and reduce a bending loss.

Figure 12:
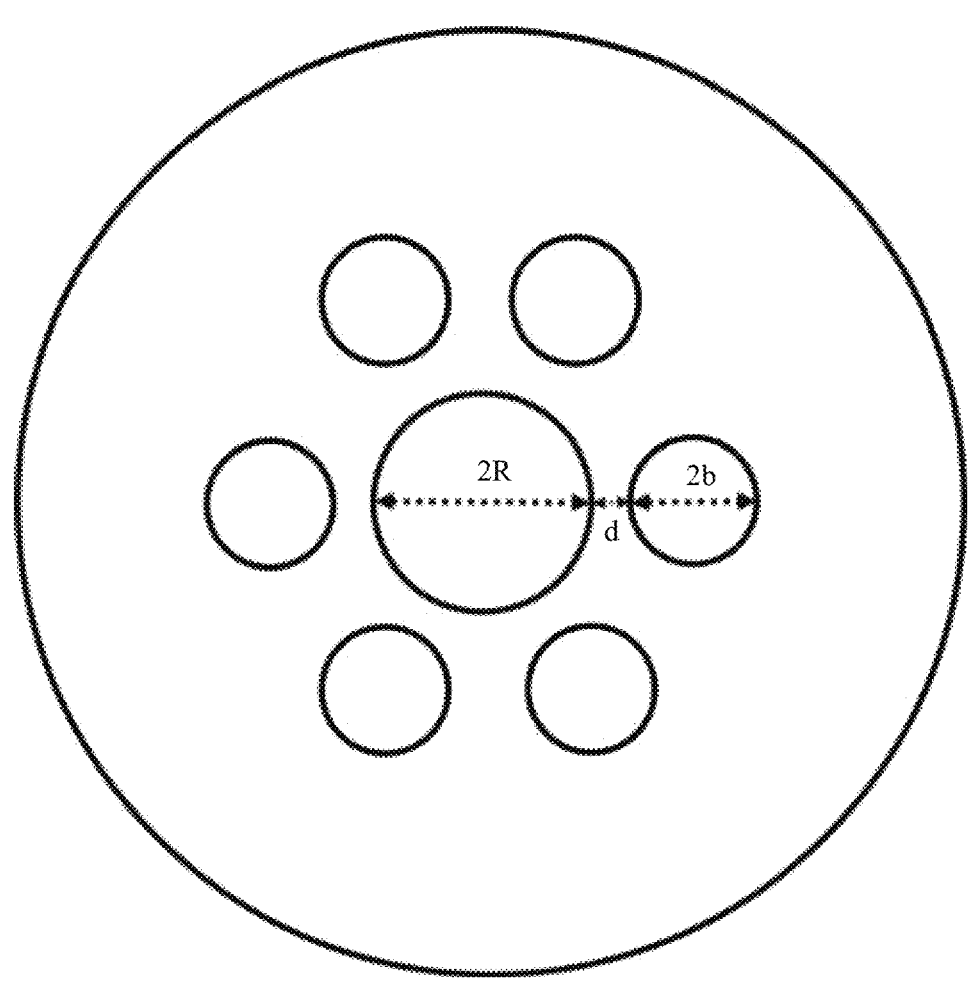
FIG. 12 is a schematic diagram of a cross-sectional structure of an air hole-assisted fiber according to an embodiment of the present invention.

FIG. 12 is a schematic diagram of a cross-sectional structure of an air hole-assisted fiber, where a plurality of air holes are added to a periphery of a fiber core. The air holes have a function similar to that of the foregoing trench, which is equivalent to reducing a refractive index of a cladding layer region, thereby further restricting a light field and making the light field more bound to the fiber core. In the figure, R is a radius of the fiber core, b is a radius of the surrounding air holes, and the radius b of the air hole is generally not less than 1.5 µm, so as to avoid that the radius of the hole is too small, which is equivalent to a defective bubble. d is a distance between the air hole and the fiber core. Generally, a smaller distance d indicates a better effect. Compared with the trench structure, the air hole is more effective in restricting the light field, but with a higher fabrication process requirement.

Based on the foregoing embodiments in FIG. 2 and FIG. 3a and FIG. 3b, a quantity of fiber cores may be further increased in the fiber, and each fiber core may be designed according to the solutions of the foregoing embodiments, so as to implement a multi-core fiber amplifier. The multi-core fiber should be designed to try to keep strong coupling between mode groups in the fiber core and weaken coupling between mode groups of the fiber cores. In addition, gain balance of the mode groups of the fiber cores is also an important factor for consideration. For different core arrangements and different quantities of fiber cores, different pumping manners may be used, including fiber core pumping manners and cladding layer pumping manners. Both of these two pumping manners can make pumping energy distributions in the fiber cores basically the same, to achieve an effect of gain balance of the cores.

Figures 13, 14:
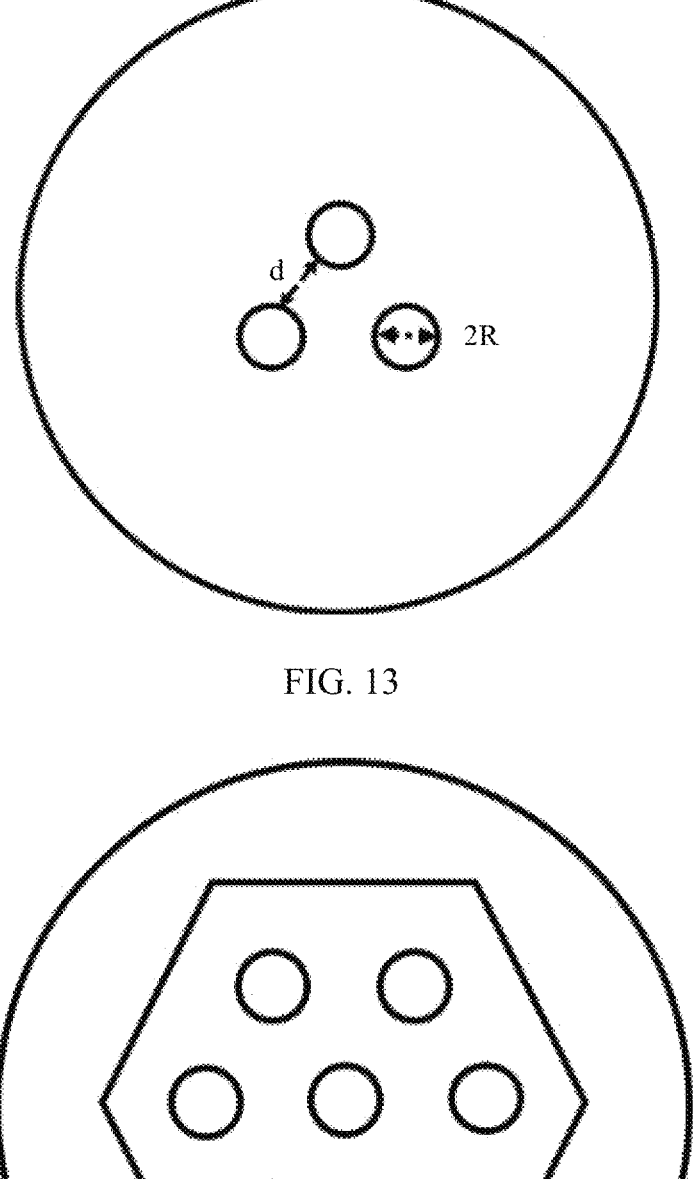
FIG. 13 is a schematic diagram of a cross-sectional structure of a three-core fiber according to an embodiment of the present invention.
FIG. 14 is a schematic diagram of a cross-sectional structure of a seven-core fiber according to an embodiment of the present invention.

When a quantity of fiber cores in a multi-core fiber is relatively small, the fiber core pumping manner may be used. FIG. 13 is a schematic diagram of a cross-sectional structure of a three-core fiber. Each fiber core is a few-mode doped fiber core etched with periodic gratings. Each fiber core uses a fiber core pumping manner, and both pump light and signal light are injected into the fiber core. Therefore, a light field overlap between the pump light and the signal light is effectively achieved, and gain improvement and gain balance of the fiber cores are achieved.

When the quantity of fiber cores in the multi-core fiber is relatively large, the cladding layer pumping manner may be used. The fiber includes an inner cladding layer and an outer cladding layer, and a plurality of fiber cores are located in the inner cladding layer. The inner cladding layer is a pumping region, and the pump light may be injected into the pumping region. A refractive index of the inner cladding layer is slightly lower than 1.444, but is higher than a refractive index of the outer cladding layer and lower than a refractive index of the fiber core. A shape of the inner cladding layer may use a structure such as a rectangle, hexagon, or a D-shape, so that the pump light can penetrate through the fiber core of the fiber for a plurality of times, to improve utilization efficiency of the pump light in the fiber core. Strong pump light is coupled into the inner cladding layer, and the pump light is evenly distributed in a fiber core region doped with rare earth element ions. The inner cladding layer is generally not circular, because the pump light tends to propagate spirally in a circular inner cladding layer and becomes vortex light, and cannot enter the fiber core region having the rare earth ions and the signal light.

FIG. 14 is a schematic diagram of a cross-sectional structure of a seven-core fiber according to an embodiment of the present invention. Each fiber core is a few-mode doped fiber core etched with periodic gratings, and an inner cladding layer is a hexagonal region and also a pumping region. Compared with the fiber core pumping manner, the cladding layer pumping manner has a simple structure and can also achieve gain balance of the fiber cores, but energy conversion efficiency of pump light is relatively low.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality.

Although the present invention is described with reference to specific features and embodiments thereof, it is obvious that various modifications and combinations may be made thereto. Correspondingly, the specification and the accompanying drawings are merely example description of the present invention defined by the appended claims, and are considered as any of or all modifications, variations, combinations or equivalents that cover the scope of the present invention. It is clear that a person skilled in the art can make various modifications and variations to the present invention without departing from the scope of the present invention. The present invention is intended to cover these modifications and variations provided that they fall within the scope of protection defined by the following claims and their equivalent technologies.

What is claimed is:

1. A fiber amplifier, comprising:

optical isolators at an input end and at an output end of the fiber amplifier, wherein the optical isolator and the input end is coupled to receive few-mode signal light signals;

a pump laser;

a pump and signal combiner;

a few-mode doped fiber; and wherein:

the pump laser is configured to output pump light;

the pump and signal combiner is configured to couple the input few-mode signal light signals and the pump light into the few-mode doped fiber;

periodic gratings etched into the fiber wherein refractive indexes of a fiber core of the few-mode doped fiber are distributed to be gradient along a radial direction of a cross section and an effective refractive index difference $\Delta n$ created by the periodic gratings between adjacent mode groups of the few-mode signal light signals is equal to a wavelength of the few-mode signal light;

the fiber core is etched with periodic gratings along an axial direction; and periods of the gratings, namely a product of the effective refractive index difference between adjacent mode groups is equal to a wavelength of few-mode signal light, satisfy a phase matching condition for passing the few-mode signal light signals and filtering other light signals.

2. The fiber amplifier according to claim 1, wherein that periods of the gratings that a product of each of the periods of the plurality of gratings and an effective refractive index difference between adjacent mode groups of the few-mode signal light is equal to a wavelength of the few-mode signal light, and the adjacent mode groups of the few-mode signal light are two adjacent mode groups of a plurality of mode groups that are comprised in the signal light and that are sequentially arranged based on corresponding effective refractive indexes.

3. The fiber amplifier according to claim 2, wherein the refractive indexes of the fiber core of the few-mode doped fiber are distributed to be gradient along the radial direction of the cross section so that effective refractive index differences between adjacent mode groups are equal to each other, and the periods of the plurality of gratings are equal to each other.

4. The fiber amplifier according to claim 1, wherein a fiber core region of the few-mode doped fiber is doped with rare earth element ions.

5. The fiber amplifier according to claim 4, wherein the fiber core region is doped with rare earth element ions in a manner of uniform doping or layered doping.

6. The fiber amplifier according to claim 5, wherein a strength range of the etched grating is $[4*10^{-7}, 3*10^{-2}]$.

7. The fiber amplifier according to claim 6, wherein the fiber core region is doped with rare earth element ions in a layered manner, and the strength range of the etched grating is $[1*10^{-6}, 3*10^{-2}]$.

8. The fiber amplifier according to claim 1, wherein the fiber core of the few-mode doped fiber uses a silicon dioxide material doped with germanium dioxide, and a cladding layer uses a silicon dioxide material.

9. The fiber amplifier according to claim 1, wherein a periphery of the fiber core of the few-mode doped fiber further comprises an inner cladding layer, a trench layer, and an outer cladding layer, and a refractive index of the trench layer is less than refractive indexes of the inner cladding layer and an outer cladding layer.

10. The fiber amplifier according to claim 1, wherein the periphery of the fiber core of the few-mode doped fiber is provided with a plurality of air holes.

11. The fiber amplifier according to claim 1, wherein the few-mode doped fiber comprises a plurality of fiber cores, which use a fiber core pumping manner, and the pump light is injected into each fiber core.

12. The fiber amplifier according to claim 1, wherein the few-mode doped fiber comprises a plurality of fiber cores, which use a cladding layer pumping manner, the cladding layer comprises a pumping region, and the pump light is injected into the pumping region.

13. The fiber amplifier according to claim 1, wherein the fiber amplifier further comprises a splitter, configured to separate the signal light and the pump light output by the few-mode doped fiber, and input separated pump light into the pump and signal combiner.

14. The fiber amplifier according to claim 1, wherein the fiber amplifier further comprises a first isolator and a second isolator, the first isolator is connected to an input end of the pump and signal combiner, and the second isolator is connected to an output end of the few-mode doped fiber.

* * * * *